United States Patent
Hoover et al.

(10) Patent No.: US 10,464,679 B2
(45) Date of Patent: Nov. 5, 2019

(54) STOWABLE SEAT WITH PIVOTING SEAT PAN FOR ADVANCED COMFORT

(71) Applicant: AMI Industries, Inc., Colorado Springs, CO (US)

(72) Inventors: Douglas E. Hoover, Colorado Springs, CO (US); Kyler Marutzky, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 245 days.

(21) Appl. No.: 15/682,941

(22) Filed: Aug. 22, 2017

(65) Prior Publication Data

US 2019/0061951 A1 Feb. 28, 2019

(51) Int. Cl.
| | |
|---|---|
| *B64D 11/06* | (2006.01) |
| *B60N 2/30* | (2006.01) |
| *B60N 2/22* | (2006.01) |
| *B60N 2/90* | (2018.01) |
| *B60N 2/80* | (2018.01) |

(52) U.S. Cl.
CPC .......... *B64D 11/064* (2014.12); *B60N 2/2209* (2013.01); *B60N 2/305* (2013.01); *B60N 2/3031* (2013.01); *B60N 2/80* (2018.02); *B60N 2/995* (2018.02); *B64D 11/0619* (2014.12); *B64D 11/0643* (2014.12); *B64D 11/0691* (2014.12); *B64D 11/0698* (2014.12)

(58) Field of Classification Search
CPC ........ B60N 2/2209; B60N 2/3031; A47C 9/06
USPC ............. 297/14, 316–318, 325, 329, 411.43, 297/423.28
See application file for complete search history.

(56) References Cited

U.S. PATENT DOCUMENTS

| | | | | |
|---|---|---|---|---|
| 160,624 A | * | 3/1875 | Spencer ................. | B60N 2/045 248/395 |
| 1,199,002 A | * | 9/1916 | Freise ...................... | A47C 9/06 297/14 |
| 1,712,704 A | * | 5/1929 | Kiser ....................... | A47C 9/06 108/38 |
| 1,761,673 A | * | 6/1930 | Laursen ................... | A47C 9/06 297/14 |
| 2,492,106 A | * | 12/1949 | Orton ...................... | A47C 7/566 297/318 |
| 3,202,453 A | * | 8/1965 | Richards .............. | B60N 2/3011 296/66 |

(Continued)

FOREIGN PATENT DOCUMENTS

| | | |
|---|---|---|
| EP | 3072815 | 9/2016 |
| WO | 2017054945 | 4/2017 |
| WO | 2017080939 | 5/2017 |

OTHER PUBLICATIONS

European Patent Office, European Search Report dated Dec. 7, 2018 in Application No. 18189017.9.

*Primary Examiner* — Robert Canfield
(74) *Attorney, Agent, or Firm* — Snell & Wilmer, L.L.P.

(57) ABSTRACT

A stowable seat is provided. The stowable seat may comprise a housing and a first track coupled to the housing. A backrest may be slidably coupled to the first track. A seat pan may be rotatable relative to the backrest. A second track may be in operable communication with the seat pan. An angle between the seat pan and the second track may increase as the seat pan translates away from the housing.

17 Claims, 10 Drawing Sheets

(56) References Cited

U.S. PATENT DOCUMENTS

| | | | | |
|---|---|---|---|---|
| 4,679,749 | A | * | 7/1987 | Ryan ..................... B64D 11/06 244/122 R |
| 4,880,273 | A | * | 11/1989 | Markus ................... A47C 3/32 297/325 |
| 4,902,069 | A | | 2/1990 | Lehnert |
| 6,641,214 | B2 | * | 11/2003 | Veneruso ............ B60N 2/0232 297/216.15 |
| 6,739,661 | B1 | * | 5/2004 | Dukes .................. B60N 2/0232 297/256.1 |
| 6,896,322 | B1 | | 5/2005 | Foy |
| 8,403,415 | B2 | * | 3/2013 | Lawson ................. B64D 11/06 297/318 |
| 2016/0280377 | A1 | | 9/2016 | Pinkal |
| 2016/0325838 | A1 | * | 11/2016 | Erhel ...................... B60N 2/34 |
| 2016/0376007 | A1 | | 12/2016 | Meindlhumer |
| 2017/0015423 | A1 | | 1/2017 | Udriste et al. |
| 2018/0194474 | A1 | * | 7/2018 | Jones .............. B64D 11/06395 |

* cited by examiner

FIG.5 ated to the seat pan. The lever may be in operable communication with the pin. In various embodiments, a damper may be coupled to the backrest.

In various embodiments, pivoting the seat pan away from the backrest may cause a second angle of the backrest relative to vertical to increase. A dual wheel may be coupled to the seat pan. The dual wheel may be located within a guide path defined by the track.

A method of making a stowable seat may comprise slidably coupling a backrest to a first track, pivotably coupling a seat pan to the backrest, and slidably coupling the seat pan to a second track such that a first angle seat pan relative to horizontal changes as the seat pan translates along the second track.

In various embodiments, the method may further comprise locating a plurality of apertures along the second track, and configuring the plurality of apertures and a pin coupled to the seat pan to regulate translation of the seat pan along the second track. The method may further comprise coupling a lever to the seat pan. The lever may be in operable communication with the pin. In various embodiments, a second angle formed by the backrest and the vertical track may change as the seat pan translates along the second track.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

STOWABLE SEAT WITH PIVOTING SEAT PAN FOR ADVANCED COMFORT

FIELD

The present disclosure relates to stowable seats, and, more specifically, to a stowable seat with a pivoting seat pan for advanced comfort.

BACKGROUND

Aircraft cabin seats (also referred to as stowable seats) are used for flight attendant safety and comfort during taxi, takeoff, landing, and inflight rest periods. Aircraft cabin seats may be used for long periods of time depending on flight duration. Traditional cabin seats may cause pain and/or discomfort for the crew member occupying the seat due to the non-ergonomic geometry of the seat. Furthermore, the space available for extending a cabin seat into a more comfortable position may be minimal, as useable volumetric space on an aircraft tends to be limited, and the cabin seats should not hinder ingress and egress for passengers in the event of an emergency.

SUMMARY

A stowable seat may comprise a housing and a first track coupled to the housing. A backrest may be in operable communication to the first track. A seat pan may be rotatable relative to the backrest. A second track may be in operable communication with the seat pan. A first angle between the seat pan and the second track may increase as the seat pan translates away from the housing.

In various embodiments, a footrest may be pivotably coupled to the seat pan, and a cushion may be slidably coupled to the footrest. In various embodiment, translation of the backrest along the first track may cause the seat pan to translate along the second track. A second angle of the backrest relative to vertical is at least 40° when the stowable seat is in a fully reclined position. In various embodiments, a crossbar may be disposed within the housing. The crossbar may limit rotation of the second track. In various embodiments, a damper may be coupled to the backrest.

In various embodiments, a plurality of apertures may be located along the second track. A pin may be coupled to the seat pan. The pin being located within a first aperture of the plurality of apertures may restrict translation of the seat pan along the second track. A lever may be coupled to the seat pan. The lever may be in operably communication with the pin.

In various embodiments, pivoting the seat pan away from the backrest may translate the backrest along the first track. In various embodiments, increasing a second angle formed by the backrest and the first track may increase the first angle formed by the seat pan and the second track.

A seat for an aircraft may comprise a backrest and a seat pan rotatable relative to the backrest. A track may be in operable communication with the seat pan. A first angle formed by the seat pan and the track may change as the seat pan translates along the track.

In various embodiments, a plurality of apertures may be located along the track, and a pin may be coupled to the seat pan. The pin being located within a first aperture of the plurality of apertures may restrict translation of the seat pan along the track. A lever may be coupled to the seat pan. The

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily repeated herein for the sake of clarity. As used herein, "distal" refers to the direction outward, or generally, away from a reference component. As used herein, "proximal" and/or "proximate" refers to a direction inward, or generally, towards the reference component.

Stowable seats of the present disclosure may include a seat pan configured to rotate and/or pivot as the stowable seat transitions to a reclined position. The seat pan may be slidably coupled to a track that allows the seat pan to translate laterally. As the seat pan translates laterally, an angle of seat backrest relative to vertical and an angle of the seat pan relative to horizontal may both increase, thereby elevating the knees of the seat's occupant as the seat reclines. Elevating the knees and reclining the back may place the occupant in a more comfortable position and/or may reduce a load on the occupant's legs, spine, and/or buttocks.

Figure 1:
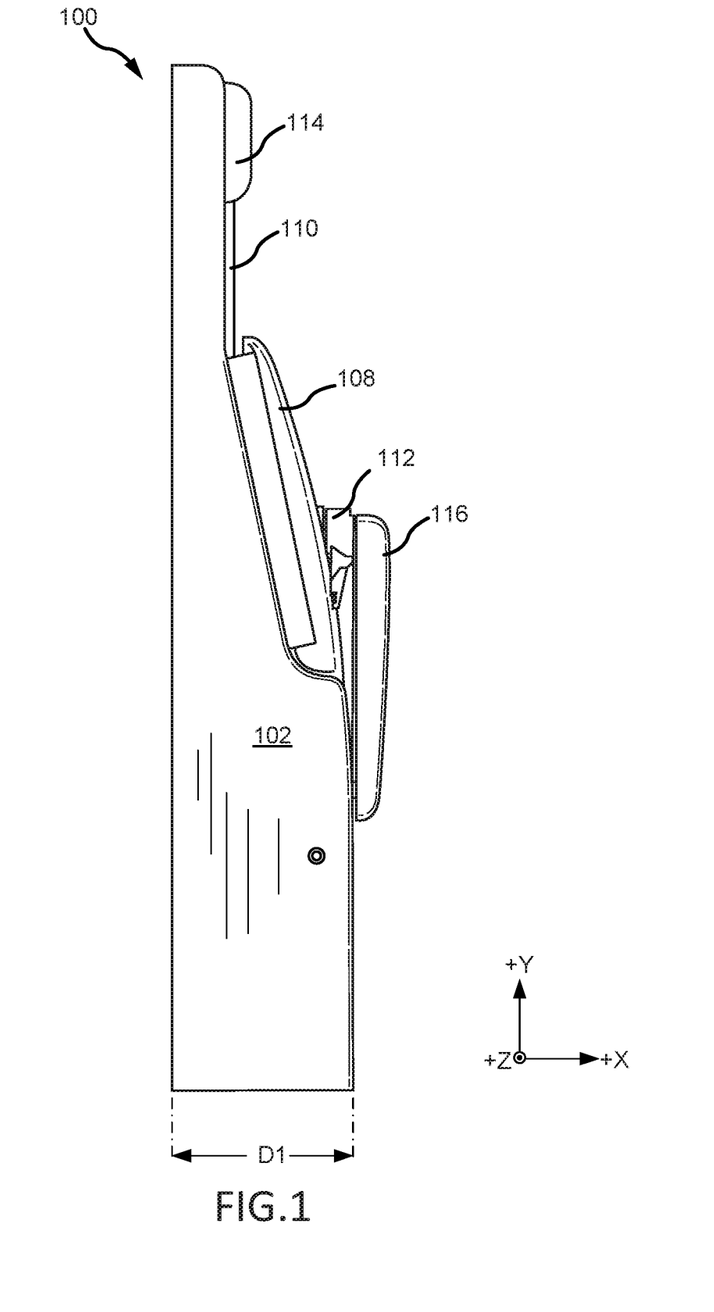
FIG. 1 illustrates a side view of a stowable seat in a stowed position, in accordance with various embodiments.

With reference to FIG. 1, a stowable seat 100 is shown in a stowed position with a backrest 110 and a seat pan 112 of stowable seat 100 stored, at least partially, within a housing 102 of stowable seat 100. Housing 102 may provide structural support for stowable seat 100. Housing 102 may comprise a depth D1. In various embodiments, depth D1 may be less than or equal to 1 foot (30.5 cm). In various embodiments, depth D1 may be 11.5 inches (29.2 cm).

In various embodiments, arm rests 108 may be pivotably coupled to housing 102 such that arm rests 108 may pivot towards housing 102 when in the stowed position. Backrest 110 may include a head rest 114. In the stowed position, seat pan 112 may fold toward backrest 110 so that seat pan 112 is disposed at least partially in housing 102. A retractable footrest 116 may pivotably couple to seat pan 112 and fold against seat pan 112 in response to stowable seat 100 being the stowed position.

Figure 2:
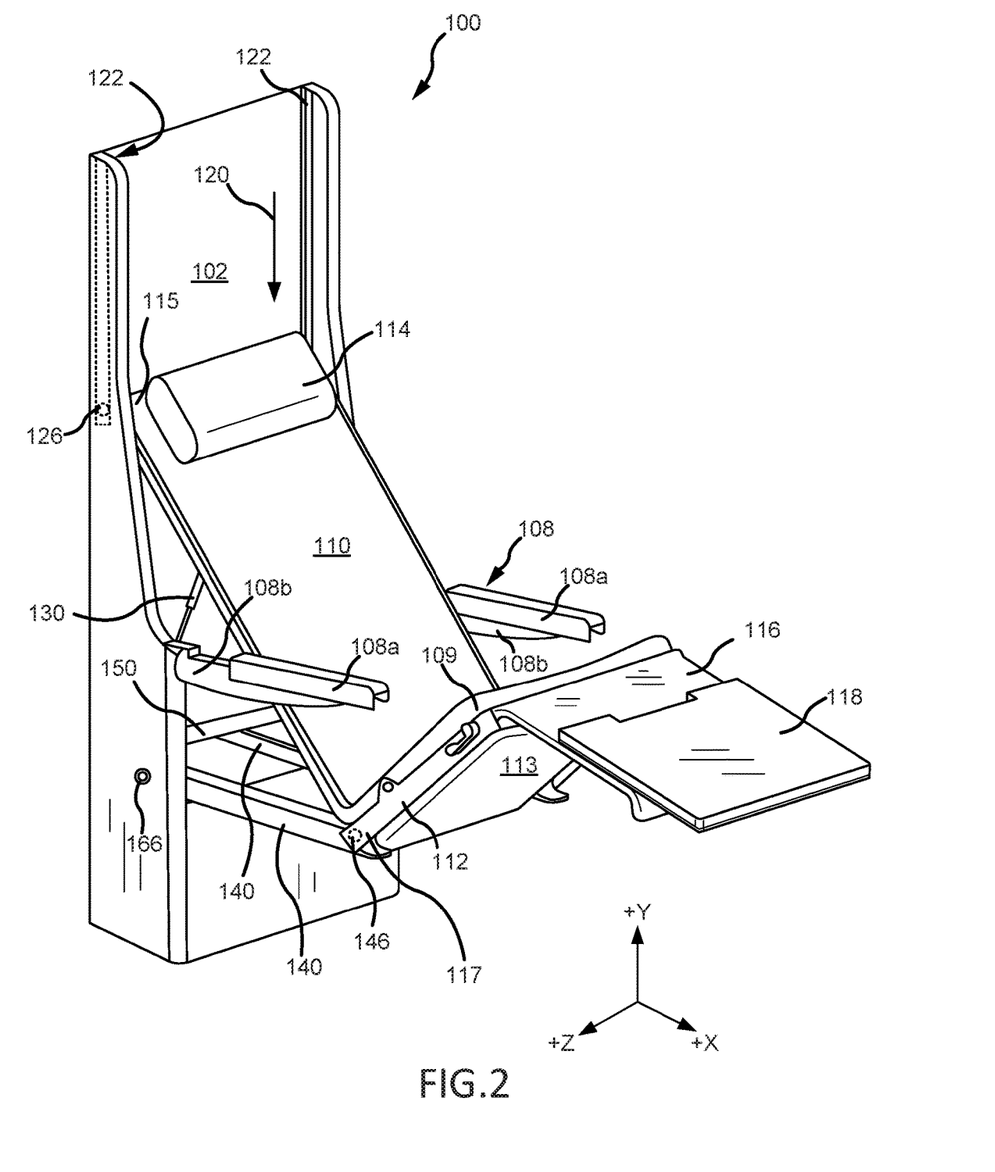
FIG. 2 illustrates a perspective view of a stowable seat in a fully extended position, in accordance with various embodiments.

With reference to FIG. 2, a perspective view of stowable seat 100 in a fully reclined position is shown, in accordance with various embodiments. As seat 100 goes from a stowed position (FIG. 1) to a reclined, an upper portion 115 of backrest 110, proximate head rest 114 and opposite seat pan 112, translates downward in the direction of arrow 120. Upper portion 115 of backrest 110 may be in operable communication with a first set of tracks 122 (also referred to as vertical tracks) coupled to opposing sides of housing 102. Backrest 110 may be slidably coupled to tracks 122 such that upper portion 115 of backrest 110 may translate vertically along tracks 122. As backrest 110 translates downward (i.e., in the negative y-direction) along tracks 122, an inboard portion 117 of seat pan 112 that is proximate backrest 110 translates laterally away from housing 102 along a second set of tracks 140 (also referred to as lateral tracks). Tracks 140 may be located on opposing sides of seat pan 112. Tracks 140 may be in operable communication with seat pan 112. Seat pan 112 may be slidably coupled to tracks 140 such that an inboard portion 117 of seat pan 112 may translate laterally along tracks 140. As seat pan 112 translates laterally away from housing 102 and along tracks 140, seat pan 112 pivots upwards such that an angle alpha (α) (with monetary reference to FIG. 4F) of seat pan 112 relative to horizontal (i.e., relative to the x-axis) increases. In various embodiments, a cushion 109 may be attached to seat pan 112.

Figure 3A:
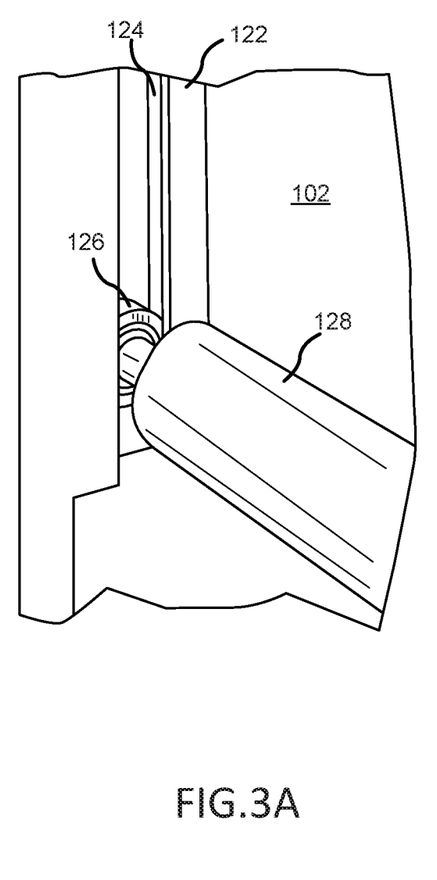
FIGS. 3A and 3B illustrate details of a vertical track and a horizontal track, respectively, of the stowable seat of FIG. 2, in accordance with various embodiments.

With reference to FIG. 3A, further detail of one of the vertical tracks 122 is illustrated, according to various embodiments. Each of the vertical tracks 122 may define a groove or guide path 124 for a wheel 126 attached to backrest 110 (FIG. 2). With combined reference to FIG. 3A and FIG. 2, wheel 126 may be coupled to upper portion 115 of backrest 110 via a boss or wheel support structure 128. Backrest 110 may include two wheels 126 and two wheel support structures 128 extending from opposing sides of upper portion 115. Stated another way, a first wheel support structure 128 and first wheel 126 may extend from a first side of upper portion 115 of backrest 110 and engage a first vertical track 122, and a second wheel support structure 128 and second wheel 126 may extend from a second side of upper portion 115 of backrest 110 opposite the first side of upper portion 115 and engage a second vertical track 122.

Figure 3B:
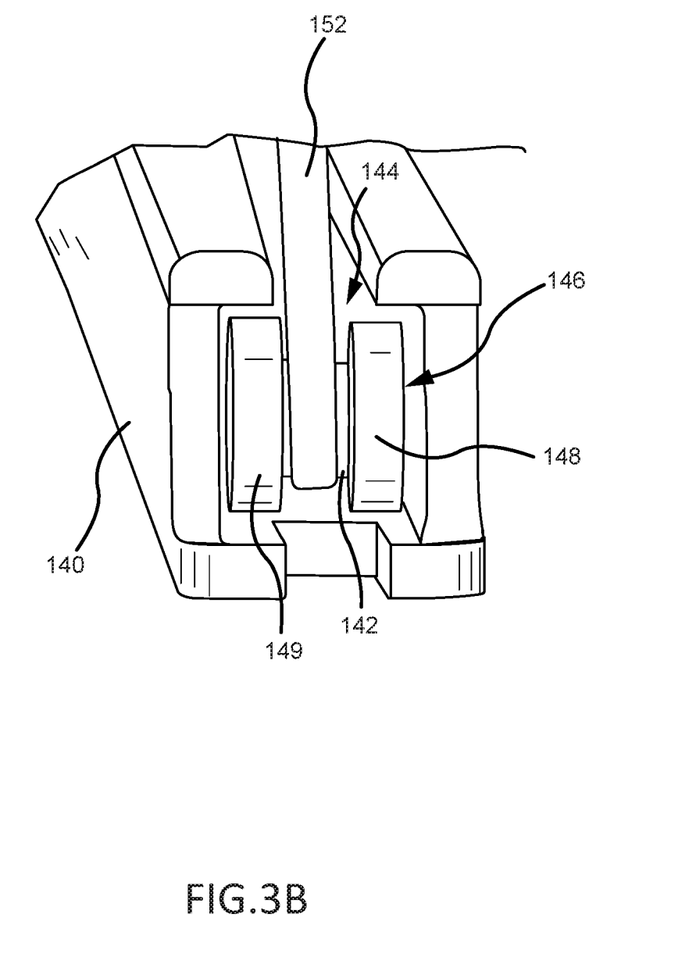

With reference to FIG. 3B, further detail of one the lateral tracks 140 is illustrated, according to various embodiments. Each of the lateral tracks 140 may define a groove or guide path 144 for a dual wheel 146 attached to seat pan 112 (FIG. 2). Dual wheel 146 may comprise a first wheel 148 and a second wheel 149 coupled to an axle 142. With combined reference to FIG. 3B and FIG. 2, dual wheel 146 may be coupled to inboard portion 117 of backrest 110 via a boss or wheel support structure 152. Seat pan 112 may include two dual wheels 146 and two wheel support structures 152 located at opposing sides of inboard portion 117. Stated another way, a first wheel support structure 152 and first dual wheel 146 may be located proximate a first side of inboard portion 117 of seat pan 112 and engage a first lateral track 140, and a second wheel support structure 152 and second dual wheel 146 may be located proximate a second side of inboard portion 117 of seat pan 112 opposite the first side of inboard portion 117 and engage a second lateral track 140.

Returning to FIG. 2, in various embodiments, a damper 130 may be coupled between backrest 110 and housing 102. Damper 130 may control the speed of movement of backrest 110. Stated another way, damper 130 may control the speed at which wheels 126 slide along vertical tracks 122. Stated yet another way, damper 130 may control the speed at which seat 100 transitions into a reclined position. Damper 130 may comprise a gas spring damper or other suitable shock absorber.

Arm rests 108 may be manually pivoted away from housing 102 such that arm rests are positioned 90 degrees from vertical. Arm rests 108 may include a first portion 108a that is slidably coupled to a second portion 108b of arm rests 108. First portion 108a may be configured to translate (i.e., slide) laterally along second portion 108b away from housing 102. Arm rests 108 being configured to slide away from housing 102 may allow arm rests 108 to provide continued arm support to the occupant of seat 100 as backrest 110 moves away from housing 102 (i.e., as the angle of backrest 110 relative to vertical increases).

Footrest 116 may be manually pivoted away from underside surface 113 of seat pan 112 to provide lower leg and foot support to an occupant of seat 100. In various embodiments, footrest 116 may be deployed by pivoting footrest 116 approximately 180° about an end of seat pan 112. In various embodiments, a cushion 118 may be slidably coupled to footrest 116. Cushion 118 may be configured to slide along footrest 116, away from seat pan 112 to provide additional lower leg and/or foot support length.

In various embodiments, housing 102 may include a crossbar 150. Crossbar 150 may extend between opposing sides of housing 102. Crossbar 150 may limit rotation of lateral tracks 140. For example, when seat 100 transitions from the stowed position (FIG. 1) to a taxi-takeoff-landing (TTL) position (FIG. 4C) and/or to a reclined position, lateral tracks 140 may rotate away from housing 102. Lateral tracks 140 may continue to rotate away from housing 102 until they abut against crossbar 150. In various embodiments, the location of crossbar 150 may be selected to prevent lateral tracks 140 from extending beyond about 90 degrees from vertical (i.e., from extending beyond about 90 degrees relative to the positive y-axis). As used herein only, "about" means±10 degrees. In various embodiments, crossbar 150 may comprise a metal. For example, crossbar 150 may comprise aluminum, nickel, copper, steel, titanium, and/or one or more alloys of the same. In various embodiments, crossbar 150 may comprise a non-metal. For example, crossbar 150 may comprise plastic, wood, ceramic, or carbon composite.

Figure 4A:
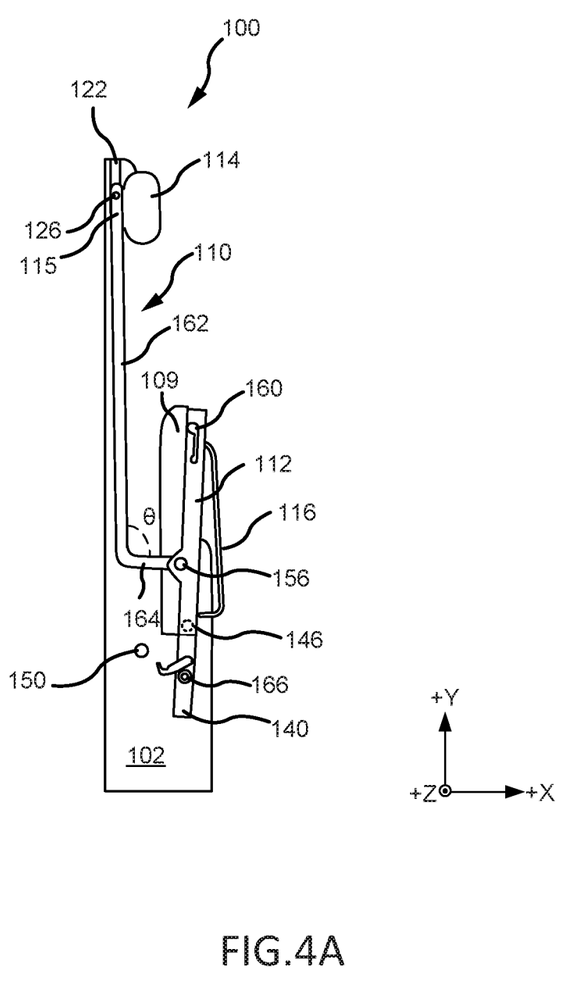
FIG. 4A illustrates a side view of a stowable seat in a stowed position, in accordance with various embodiments.

With reference to FIG. 4A, a side view of stowable seat 100 in a stowed position is shown, in accordance with various embodiments. In FIGS. 4A, 4B, 4C, 4D, 4E, and 4F arm rests 108 and cushion 118 (FIG. 2) have been removed for clarity. Backrest 110 may comprise a rigid L-shaped structure including a back support portion 162 and a lateral portion 164 extending from the back support portion 162. In various embodiments, an angle theta (θ) between back support portion 162 and a lateral portion 164 may be about 90 degrees. As used herein only, "about" means±10 degrees. In the stowed position, back support portion 162 and lateral portion 164 may be located within housing 102. Seat pan 112 may be pivotably coupled to lateral portion 164 of backrest 110 at pivot joint 156.

Figure 4B:
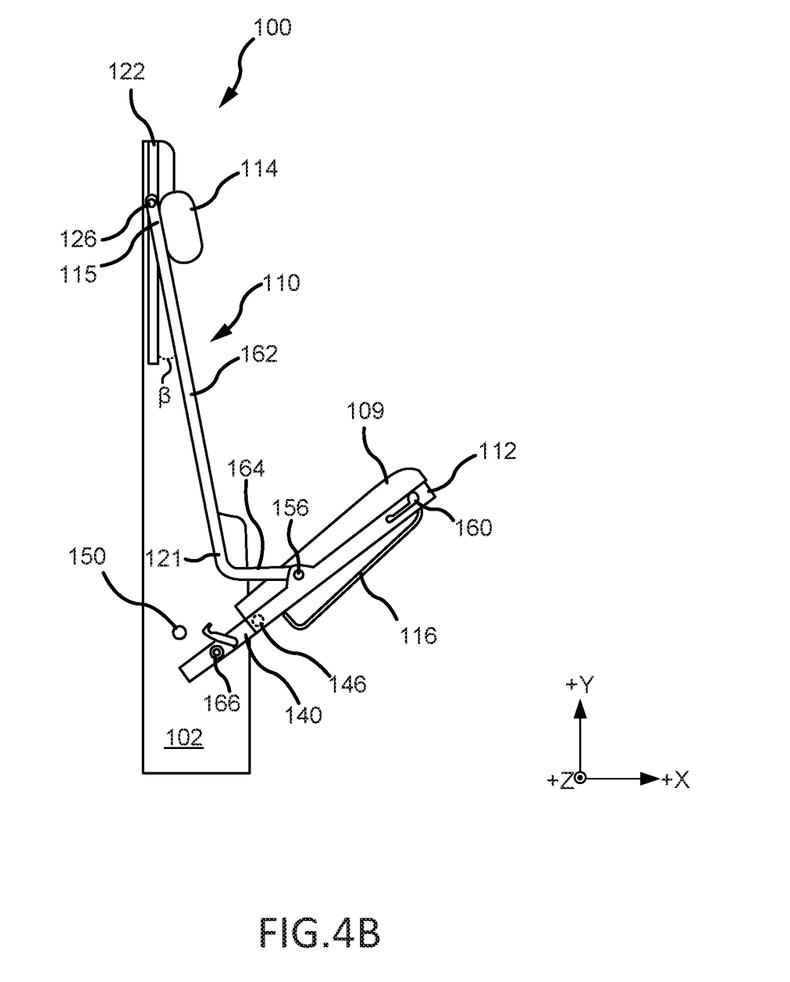
FIG. 4B illustrates a side view of a stowable seat transition between a stowed position and a taxi-takeoff-landing (TTL) position, in accordance with various embodiments.

With reference to FIG. 4B, a side view of stowable seat 100 between the stowed position and the TTL position is shown, in accordance with various embodiments. As seat 100 transitions from the stowed position (FIG. 1) to the TTL position (FIG. 4C), seat pan 112 and lateral tracks 140 may rotate away from housing 102. In various embodiments, seat pan 112 may be rotated away from housing 102 by pivoting lateral tracks 140, which are in operable communication with and may be coupled to seat pan 112, around an axle 166. Stated differently, as seat 100 transitions from the stowed position to the TTL position, seat pan 112 and lateral tracks 140 may rotate from a relatively vertical orientation toward a relatively horizontal orientation. As seat pan 112 translates toward the TTL position, seat pan 112 may also rotate around pivot joint 156 and away from back support portion 162 of backrest 110. As lateral tracks 140 rotate around axle 166 and away from housing 102, pivot joint 156 translates away from housing 102 which causes the lower portion 121 of lateral portion 164 of backrest 110 to translate laterally away from housing 102. As lower portion 121 of lateral portion 164 translates away from housing 102 (i.e., moves in the positive x-direction) upper portion 115 of backrest 110 translates downward (i.e., moves in the negative y-direction) along vertical tracks 122. As lower portion 121 translates away from housing 102 and upper portion 115 moves downward, an angle beta (β) of back support portion 162 relative to vertical increases.

Figure 4C:
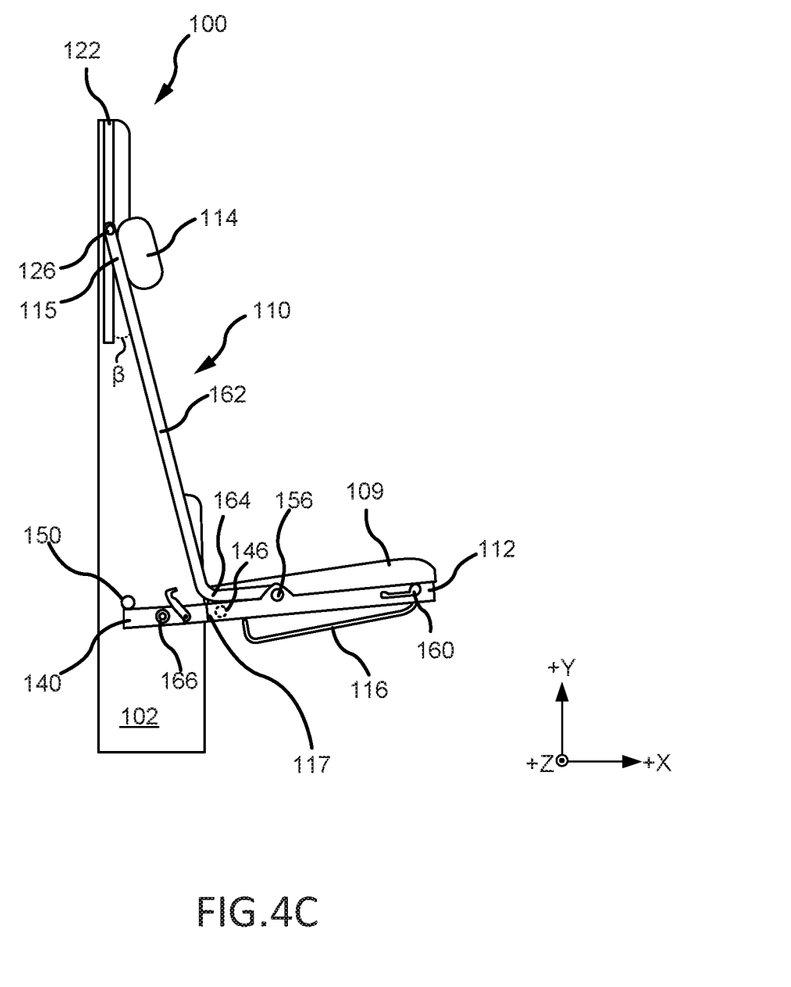
FIG. 4C illustrates a side view of a stowable seat in a TTL position, in accordance with various embodiments.

With reference to FIG. 4C, a side view of stowable seat 100 in the TTL position is shown, in accordance with various embodiments. In the TTL position, lateral tracks 140 may contact crossbar 150 and further rotation of lateral tracks 140 and seat pan 112 away from housing 102 is prevented. Additionally, rotation of seat pan 112 around pivot joint 156 may cease due to lateral portion 164 of backrest 110 contacting (or "bottoming out" against) seat pan 112. In various embodiments, in the TTL position, seat pan 112 may be oriented at an angle of about 90 degrees relative to back support portion 162 of backrest 110. As used herein only, "about" means±10 degrees. Stated differently, in the TTL position, seat pan 112 and lateral tracks 140 may be oriented substantially parallel to lateral portion 164 of backrest 110. As used herein only, "substantially parallel" means±10 degrees from parallel. Rotation of lateral tracks 140 about axle 166 may cause pivot joint 156 to translate away from housing 102 and upper portion 115 of backrest 110 to translate downward in the negative y-direction. In various embodiments, upper portion 115 of backrest 110 may move between 3.0 inches and 10.0 inches (i.e., between 7.62 cm and 25.4 cm) when translating from the stowed position (FIG. 4A) to the TTL position. In various embodiments, upper portion 115 of backrest 110 may move between 6.0 inches and 8.0 inches (i.e., between 15.24 cm and 20.32 cm) when translating from the stowed position (FIG. 4A) to the TTL position. As upper portion 115 of backrest 110 slides down vertical tracks 122 and lateral portion 164 of backrest 110 translates laterally away from housing 102, the angle β of back support portion 162 relative to vertical may increase.

Figures 4D, 4E:
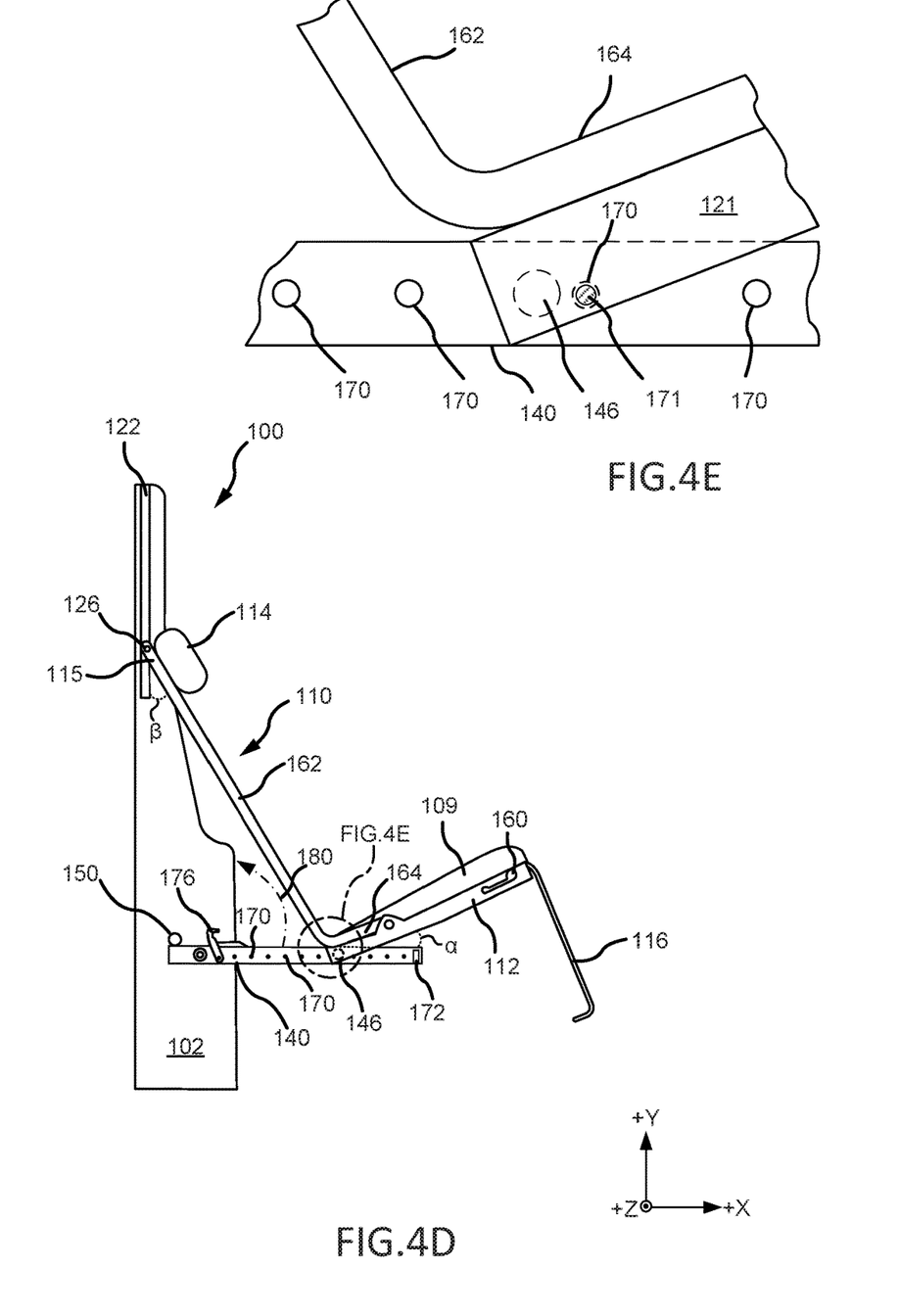
FIGS. 4D and 4E illustrate a side view of a stowable seat in a partially reclined position, in accordance with various embodiments.

With reference to FIGS. 4D and 4E, a side view of stowable seat 100 in a partially reclined position is shown, in accordance with various embodiments. When transitioning from the TTL position (FIG. 4C) to a reclined position, seat pan 112 may translate (i.e., slide) laterally away from housing 102. In various embodiments, actuation of a lever 160 coupled to seat pan 112 may allow seat pan 112 to translate along lateral tracks 140. Lever 160 may be in operable communication with one or more pin(s) 171 coupled to seat pan 112. Pin 171 may be configured to rest within a plurality of openings or apertures 170 located along lateral tracks 140. In other words, lateral tracks 140 may define a plurality of apertures 170 configured to engage pin 171. Pin 171 being located within an aperture 170 may restrain or block dual wheels 146 from moving along lateral tracks 140. Actuation of lever 160 may cause a translation of pin 171 that locates pin 171 outside of apertures 170 and allows dual wheel 146 to slide along lateral track 140. Stated differently, actuation of lever 160 may cause pin 171 to go from a "locked" position, wherein movement of dual wheels 146 is restricted, to an "unlocked" position, wherein dual wheels 146 are allowed to translate along lateral tracks 140. Release of lever 160 may cause pin 171 to return to the locked position with pin 171 located within an aperture 170, thereby restricting movement of dual wheel 146.

Apertures 170 may be disposed at various locations along lateral tracks 140. An occupant of seat 100 may select a desired positioning of seat 100 by actuating lever 160, sliding seat pan 112 along lateral tracks 140 until a desired angle α of seat pan 112 and/or a desired angle β of backrest 110 is reached, and then releasing lever 160, thereby locking dual wheels 146 in place and preventing the angle α of seat pan 112 and/or the angle β of backrest 110 from changing. In various embodiments, a number of apertures 170 and a distance between adjacent apertures 170 are selected such that the angle α of seat pan 112 relative to horizontal (i.e., the angle formed by seat pan 112 and lateral tracks 140) increases/decreases in increments of between 2 degrees and 10 degrees per aperture 170. In various embodiments, the number of apertures 170 and the distance between adjacent apertures 170 are selected such that the angle α of seat pan 112 relative to horizontal (i.e., the angle formed by seat pan 112 and lateral tracks 140) increases/decreases in increments of between 4 degrees and 6 degrees per aperture 170.

Lever 160 may also be in operable communication with a latch 176. Latch 176 may be configured to engage lateral tracks 140 and prevent rotation of lateral tracks 140 in the upward direction (i.e., in the direction of arrow 180), when seat 100 is in a reclined position. Stated differently, actuation of lever 160 may cause a translation of latch 176 that prevents lateral tracks 140 from moving toward the stowed position, while seat pan 112 is pivoted away from lateral tracks 140. In various embodiments, returning seat pan 112 to the TTL position (FIG. 4C), where inboard portion 117 of seat pan 112 is located proximate latch 176, may cause latch 176 to release and allow lateral tracks 140 to rotate in the direction of arrow 180.

Figure 4F:
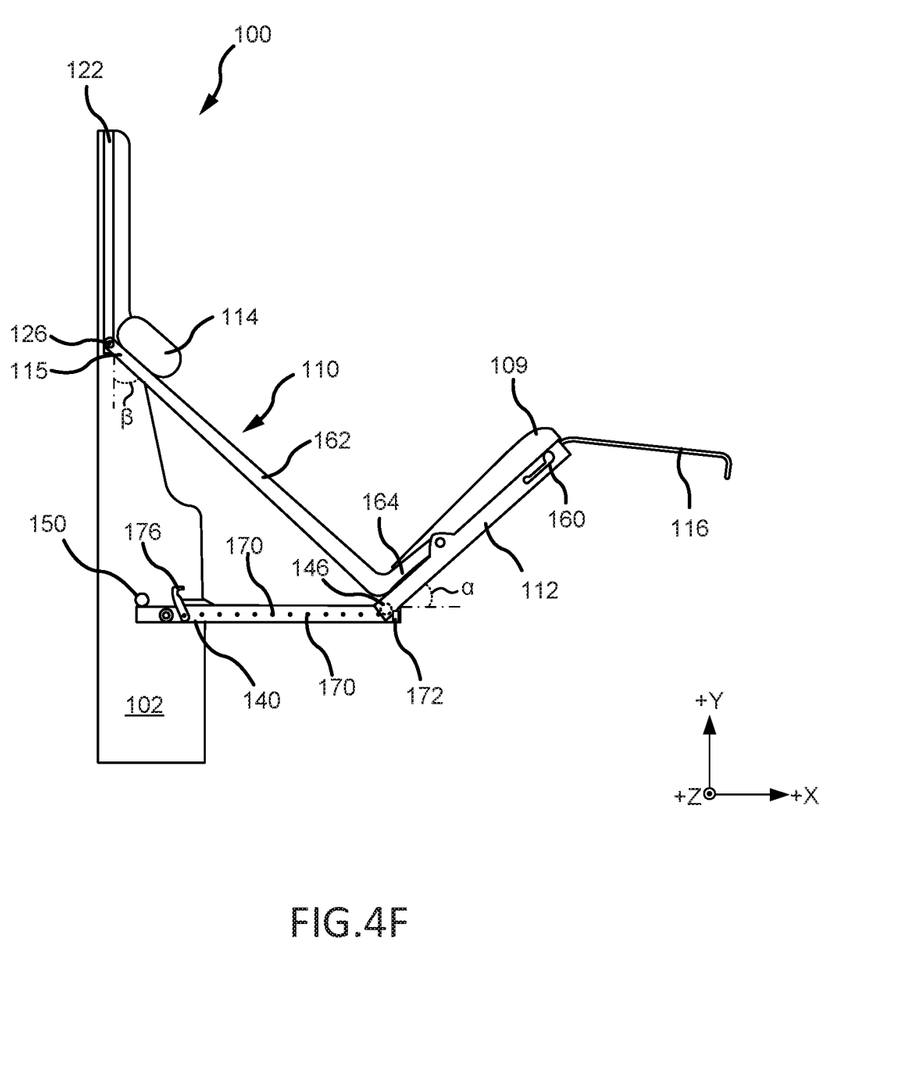
FIG. 4F illustrates a side view of a stowable seat in a fully reclined position, in accordance with various embodiments.

With reference to FIG. 4F, a side view of stowable seat 100 in a fully reclined position is shown, in accordance with various embodiments. A stopper 172, for example, a bolt, pin, or other structure capable of preventing movement of dual wheel 146 may be located at an end of lateral tracks 140 that is distal to axle 166. Stopper 172 may prevent dual wheels 146 from sliding out of lateral tracks 140. In various embodiments, upper portion 115 of backrest 110 may move between 10.0 inches and 20.0 inches (i.e., between 25.4 cm and 50.8 cm) when translating from the stowed position (FIG. 4A) to the fully reclined position. In various embodiments, upper portion 115 of backrest 110 may move between 14.0 inches and 18.0 inches (i.e., between 35.56 cm and 45.72 cm) when translating from the stowed position (FIG. 4A) to the fully reclined position.

In various embodiments, in the fully reclined position, the angle α of seat pan 112 relative to lateral tracks 140 may be between 20 degrees and 75 degrees. In various embodiments, in the fully reclined position, the angle α of seat pan 112 relative to lateral tracks 140 may be between 40 degrees and 50 degrees. In the fully reclined position, the angle β of back support portion 162 of backrest 110 relative to vertical tracks 122 may be at least 40 degrees. In various embodiments, in the fully reclined position, the angle β of back support portion 162 of backrest 110 relative to vertical tracks 122 may be between 40 degrees and 75 degrees. In various embodiments, in the fully reclined position, the angle β of back support portion 162 of backrest 110 relative to vertical tracks 122 may be between 45 degrees and 55 degrees. The angle β of backrest 110 and the angel α of seat pan 112, in the fully reclined position, may allow an occupant of seat 100 to be in a more comfortable position. The angle β of backrest 110 and the angel α of seat pan 112, in the fully reclined position, may reduce a load on the occupant's legs, spine, and/or buttocks.

Figure 5:
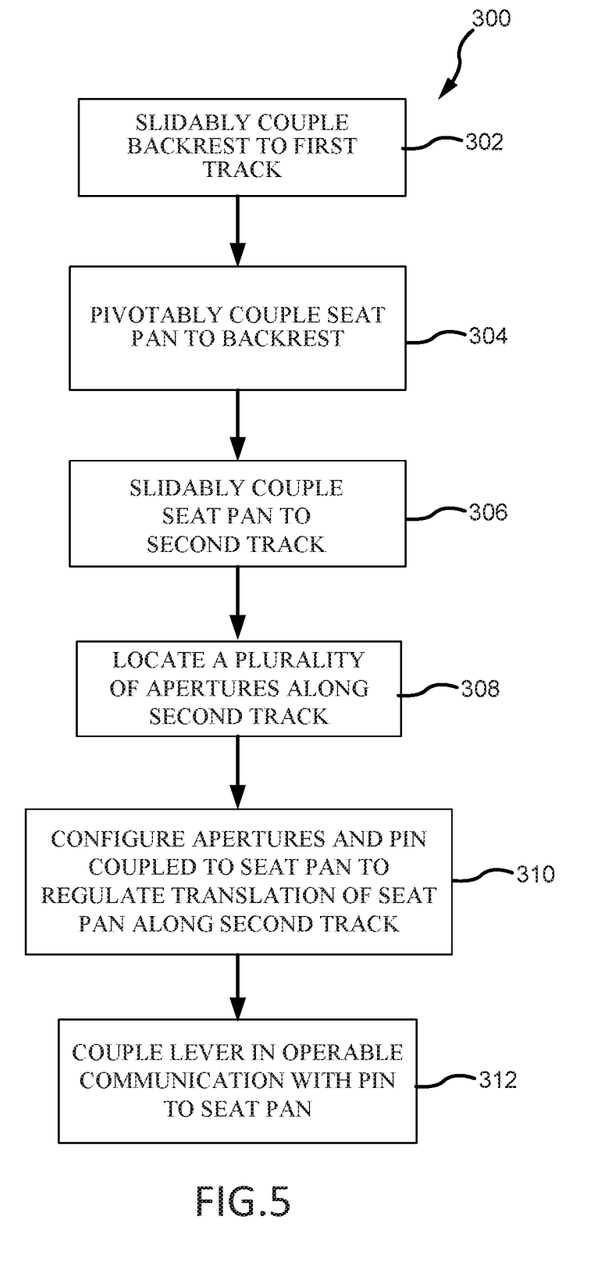
FIG. 5 illustrates a method of making a stowable seat having a pivoting seat pan, in accordance with various embodiments.

With reference to FIG. 5, a method 300 of making a stowable seat is illustrated, according to various embodiments. Method 300 may comprise slidably coupling a backrest to a first track (step 302), pivotably coupling a seat pan to the backrest (step 304), and slidably coupling the seat pan to a second track (step 306). The seat pan may be coupled to the second track such that a first angle of the seat pan relative to horizontal changes as the seat pan translates along the second track.

In various embodiments, method 300 may further comprise locating a plurality of apertures along the second track (step 308), and configuring the plurality of apertures and a pin coupled to the seat pan to regulate translation of the seat pan along the second track (step 310). Method 300 may further comprise coupling a lever to the seat pan (step 312). The lever may be in operable communication with the pin.

In various embodiments, with combined reference to FIG. 5 and FIGS. 4D and 4E, step 302 may comprise slidably coupling backrest 110 to a track 122. Step 304 may comprise pivotably coupling seat pan 112 to backrest 110. Step 306 may comprise slidably coupling seat pan 112 to track 140. Seat pan 112 may be coupled to track 140 such that angle α of seat pan 112 relative to horizontal changes as seat pan 112 translates along track 140. In various embodiments, the angle β formed by backrest 110 and track 122 changes as seat pan 112 translates along track 140. Step 308 may comprise locating a plurality of apertures 170 along track 140. Step 310 may comprise configuring the plurality of apertures 170 and pin 171 coupled to seat pan 112 to regulate translation of seat pan 112 along track 140. Step 312 may comprise coupling lever 160 to seat pan 112. Lever 160 may be in operable communication with pin 171.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stowable seat, comprising:
   a housing;
   a first track coupled to the housing;
   a backrest in operable communication with the first track;
   a seat pan rotatable relative to the housing;
   a second track in operable communication with the seat pan, wherein a first angle between the seat pan and the second track increases as the seat pan translates away from the housing,
   a plurality of apertures located along the second track; and
   a pin coupled to the seat pan, wherein the pin being located within a first aperture of the plurality of apertures restricts translation of the seat pan along the second track.

2. The stowable seat of claim 1, further comprising:
   a footrest pivotably coupled to the seat pan; and
   a cushion slidably coupled to the footrest.

3. The stowable seat of claim 1, wherein translation of the backrest along the first track causes the seat pan to translate along the second track.

4. The stowable seat of claim 1, wherein a second angle of the backrest relative to vertical is least 40 degrees when the stowable seat is in a fully reclined position.

5. The stowable seat of claim 1, further comprising a crossbar disposed within the housing, wherein the crossbar limits rotation of the second track.

6. The stowable seat of claim 1, further comprising a damper coupled to the backrest.

7. The stowable seat of claim 1, further comprising a lever coupled to the seat pan, wherein the lever is in operable communication with the pin.

8. The stowable seat of claim 1, wherein pivoting the seat pan away from the backrest translates the backrest along the first track.

9. The stowable seat of claim 1, wherein increasing a second angle formed by the backrest and the first track increases the first angle formed by the seat pan and the second track.

10. A seat for an aircraft, comprising:
    a backrest;
    a seat pan rotatable relative to the backrest;
    a track in operable communication with the seat pan, wherein a first angle formed by the seat pan and the track changes as the seat pan translates along the track;
    a plurality of apertures located along the track; and
    a pin coupled to the seat pan, wherein the pin being located within a first aperture of the plurality of apertures restricts translation of the seat pan along the track.

11. The seat of claim 10, further comprising a lever coupled to the seat pan, wherein the lever is operable communication with the pin.

12. The seat of claim 10, further comprising a damper coupled to the backrest.

13. The seat of claim 10, wherein pivoting the seat pan away from the backrest causes a second angle of the backrest relative to vertical to increase.

14. The seat of claim 10, further comprising a dual wheel coupled to the seat pan, wherein the dual wheel is located within a guide path defined by the track.

15. A method of making a stowable seat, comprising:
    slidably coupling a backrest to a first track;
    pivotably coupling a seat pan to the backrest;
    slidably coupling the seat pan to a second track such that a first angle of the seat pan relative to horizontal changes as the seat pan translates along the second track;
    locating a plurality of apertures along the second track; and
    configuring the plurality of apertures and a pin coupled to the seat pan to regulate translation of the seat pan along the second track.

16. The method of claim 15, wherein a second angle formed by the backrest and the first track changes as the seat pan translates along the second track.

17. The method of claim 15, further comprising coupling a lever to the seat pan, wherein the lever is in operable communication with the pin.

* * * * *